United States Patent Office 3,796,711
Patented Mar. 12, 1974

3,796,711
PROCESS FOR PREPARING CEPHALOSPORIN
INTERMEDIATES
Torleif Utne, Warren, and Ronald B. Jobson, Old Bridge,
N.J., assignors to Merck & Co., Inc., Rahway, N.J.
No Drawing. Filed Nov. 13, 1972, Ser. No. 306,225
Int. Cl. C07d 93/08
U.S. Cl. 260—243 R                    4 Claims

ABSTRACT OF THE DISCLOSURE

A process for the preparation of the compound:

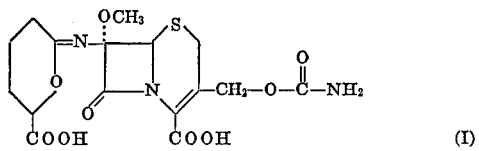

is provided, which employs diazotization of 7-(5'-amino-5' - carboxyvaleramido) - 3 - carbamoyloxymethyl-7-methoxy decephalosporanic acid in the absence of an extraneous acid. The Compound I can be used to prepare useful compounds having anti-bacterial activity.

RELATIONSHIP TO THE PRIOR ART

The compound, 7 - (5 - amino - 5-carboxyvaleramido)-3 - carbamoyloxymethyl - 7 - methoxy decephalosporanic acid, has been isolated as a fermentation product from *Streptomyces lactamdurans*, NRRL 3802. This compound has been reacted chemically to yield a family of 7α-methoxy cephalosporins, all of which have potent antibacterial activity. The most active of the family are those wherein the 7β-side chain is an acylamino substituent, such as thienylacetamido, phenylacetamido, etc. Emphasis has been placed by researchers on an economical and chemically elegant route using the fermentation isolate, to the highly desirable products. This work has been complicated by the fact that the fermentation product, which has the structural formula:

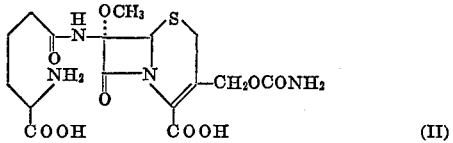

is unstable under most experimental conditions. Both the 7β-side chain and the cephem ring are vulnerable to many reactions. In addition, the presence of the 7α-methoxy substituent increases the unstability of the molecule, so that reactions useful on cephalosporins having no 7α-substitution cannot be successfully applied in this series. For instane, the process described in U.S. Pat. 3,188,311 utilizes cephalosporin C to form an iminolactone intermediate:

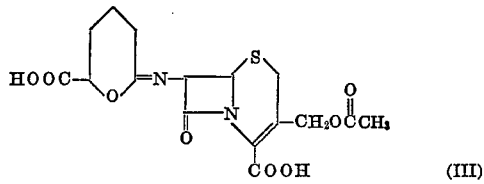

The reaction conditions in this patent, which involve treatment with a nitrosating agent, such as nitrosyl chloride, or with a positive halogen, such as N-bromo-succinimide, or with an arenediazonium salt such as benzenediazonium chloride, are not suitable for reaction with the 7α-methoxy Compound II, above, due to the enhanced instability of Compound II. Moreover, the patent avoids the presence of water in the reaction mixture since it leads to hydrolysis and further side reactions.

SUMMARY OF THE INVENTION

It has now been found that 7 - (5' - amino - 5' - carboxyvaleramido) - 3 - carbamoyloxymethyl - 7 - methoxy decephalosporanic acid can be reacted to form the imino lactone, Compound I, by forming an aqueous solution of the starting material, adding sodium nitrite, while keeping the temperature of the mixture between about 0–0.5° C.; then subsequently allowing the mixture to heat to ambient temperature. The imino lactone can be recovered in good yield (about 60%) in solid form.

Generally, reaction conditions are as follows: a 2–3 molecular excess of sodium nitrite is employed in the reaction with the starting material. The starting material is first dissolved in cold water and a cold aqueous solution of the sodium nitrite added in small amounts while stirring, at about 0–5° C., and preferably about 0° C. After stirring for 10–60 minutes, the solution is allowed to warm to ambient temperatures, or to about 25–50° C. The reaction mixture is then purified by conventional techniques (freeze-drying is convenient) to recover the imino lactone.

The imino lactone can be converted to active end products by acylation utilizing a substituted acetic acid halide or anhydride. This process does not form a part of this invention, and its is disclosed and claimed in copending U.S. Ser. No. 203,054, filed Nov. 29, 1971, in the names of Christensen and Leanza.

The final active products, generally termed 7 - acylamino - 7 - methoxy cephalosporins, are useful as antibacterial agents against both Gram-positive and Gram-negative bacteria. In addition, resistance to β-lactamases has been demonstrated. The activity spectrum includes effectiveness against many bacteria, including in vivo on *Proteus morganii*, and in addition, against *E. coli, P. vulgaris, P. mirabilis, S. schottmuelleri, K. pneumoniae AD, K. pneumoniae B,* and *P. arizoniae*.

It is noted that the substituent at position 3 of the cephalosporin ring is the carbamoyloxymethyl substituent. This can later be transformed using chemical procedures described in the literature to the substituent —CH₂A— wherein A is hydrogen, loweralkanoyloxy, carbamoyloxy, thiocarbamoyloxy, N-loweralkylcarbamoyloxy, N-lower-alklthiocarbamoyloxy, N,N - diloweralkylcarbamoyloxy, N,N - diloweralkylthiocarbamoyloxy, pyridinium, alkylpyridinium, halopyridinium, or aminopyridinium.

The term "loweralkyl" is employed to mean a carbon chain having 1–6 carbon atoms; when more than one loweralkyl group appears in a substituent, the groups can be the same or different. The term "alkyl" means 1–10 carbon atoms; "loweralkanoyl" means 1–6 carbon atoms.

This invention is further illustrated by the following examples.

EXAMPLE 1

One gram of 7 - (5' - amino - 5' - carboxyvaleramido)-7 - methoxy - 3 - carbamoyloxymethyl decephalosporanic acid (81% pure) is dissolved in 10 ml. of cold water and a solution of 0.35 g. of sodium nitrite in 5 ml. of cold water is added dropwise with stirring at 0° C. After stirring for 10 minutes, the solution is allowed to warm to 25° C. over one hour, while 50 ml. (~115% of theory due to impurities) of gas is collected in a burette. At this point the mixture is slightly acidic (pH ca. 5), gives a positive test on potassium iodide paper, and showed on TLC mainly a relatively nonpolar spot giving a brown color with ninhydrin spray.

The reaction mixture is freeze-dried, yielding 1.3 g. of cream colored solids, showing an intact β-lactam band in the IR. Most of this crude dissolved in 50 ml. of methanol is filtered quickly and concentrated to a 10 ml. volume and diluted with 100 ml. of methylene chloride. The precipitate is filtered off and dried under vacuum, giving 0.9 g. of cream colored solids, with the following physical characteristics: TLC shown mainly one spot, brown color with ninhydrin, with two minor impurities (silica gel/MeOH+$CH_2Cl_2$ 1:1, or all MeOH); and IR and NMR are essentially consistent with the proposed structure, which is the imino lactone.

EXAMPLE 2

Two grams of 7 - (5' - amino - 5' - carboxyvaleramido)- 7 - methoxy - 3 - carbamoyloxymethyl decephalosporanic acid (100% pure) is dissolved in 20 ml. of cold water and a solution of 0.70 g. of sodium nitrite in 10 ml. of cold water added dropwise with stirring at 0° C. After stirring for 2 hours, the solution is allowed to warm to 25° C. over two hours, while the 124 ml. (~114% of theory) of gas is collected in a burette.

The reaction mixture is freeze-dried and the cream colored solid dissolved in 150 ml. of methanol, the insolubles filtered off and the solution concentrated to a 50 ml. volume and diluted with 100 ml. of methylene chloride. The precipitate is filtered off and dried under vacuum, giving 2.0 g. of almost white solids, with physical characteristics similar to those in Example 1, UV $\lambda_{max}^{pH=7}$ 262.5 m$\mu$; E percent=134 (~84% of theory)

262.5 m$\mu$; $\Sigma$%=134 (~84% of theory).

UTILITY EXAMPLE 1

7$\beta$-(2-thienyl)acetamido-7$\alpha$-methoxy-3-carbamoyloxymethyl decephalosporanic acid One gram of the imino lactone from Example 2 is stirred at room temperature with 3 ml. of freshly distilled 2-thienylacetyl chloride overnight. The reaction mixture is concentrated to dryness at 25° C. under vacuum and the residue stirred with 5 ml. of warm water (35° C.) for 2 hours. The mixture is freeze-dried, extracted with ethyl acetate and chromatographed on silica gel. On elution with methanol-dichloromethane (1:1) a white solid is obtained, which on crystallization from dioxane gives 0.12 g. of a white powder identified by comparison with an authentic sample as 7$\beta$-(2'-thienylacetamido)-7$\alpha$-methoxy - 3 - carbamoyloxymethyl decephalosporanic acid, M.P. 160–165° C.; UV, IR, and NMR consistent with the assigned structure.

What is claimed is:

1. The process for preparing the compound:

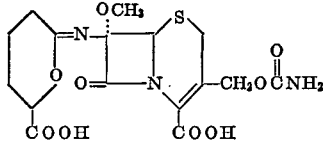

which comprises treating the compound of the formula:

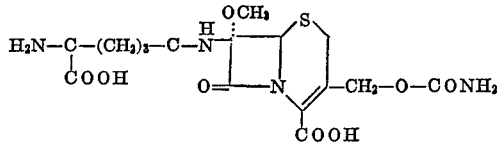

with a molecular excess of sodium nitrite at 0–5° C., then gradually warming to about 25–50° C., and recovering the product thereby produced.

2. The process of claim 1 wherein the reaction is conducted in aqueous solution.

3. The process of claim 2 wherein the molecular excess employed is 2–3 molecular equivalents, as compared to the starting material.

4. The process of claim 1 wherein the reaction is conducted without any extraneous acid.

References Cited
UNITED STATES PATENTS
3,188,311   6/1965   Morin et al. _____ 260—243

JOHN M. FORD, Primary Examiner

U.S. Cl. X.R.

424—246